United States Patent [19]

Bezborodko

[11] 4,038,971

[45] Aug. 2, 1977

[54] CONCAVE, MIRRORED SOLAR COLLECTOR

[76] Inventor: Joseph A. I. B. Bezborodko, 699 W. 239th St., Bronx, N.Y. 10463

[21] Appl. No.: 624,848

[22] Filed: Oct. 22, 1975

[51] Int. Cl.² .............................................. F24J 3/02
[52] U.S. Cl. ................................. 126/271; 126/270; 350/292; 350/299; 350/320
[58] Field of Search ............. 126/270, 271; 237/1 A; 60/641; 350/292, 299, 293, 320

[56] References Cited

U.S. PATENT DOCUMENTS

| 2,705,948 | 4/1955 | Rostock | 126/271 |
| 2,872,915 | 2/1959 | Bowen | 126/271 |
| 3,841,738 | 10/1974 | Caplan | 126/271 |
| 3,866,285 | 2/1975 | Clark | 126/271 |
| 3,898,979 | 8/1975 | Medico, Jr. | 126/271 |
| 3,929,122 | 12/1975 | Alkasab | 126/271 |

*Primary Examiner*—Kenneth W. Sprague
*Assistant Examiner*—James C. Yeung
*Attorney, Agent, or Firm*—Gottlieb, Rackman & Reisman

[57] ABSTRACT

A concave, mirrored solar collector includes a concave shell, a series of mirrored strips disposed in the shell and acting as the reflecting surface, a support for the shell and a cover. The reflecting surface serves to focus sunlight on a water-carrying pipe located along a longitudinal axis of the collector. A drive is provided for rotating the collector to "track" the sun.

14 Claims, 7 Drawing Figures

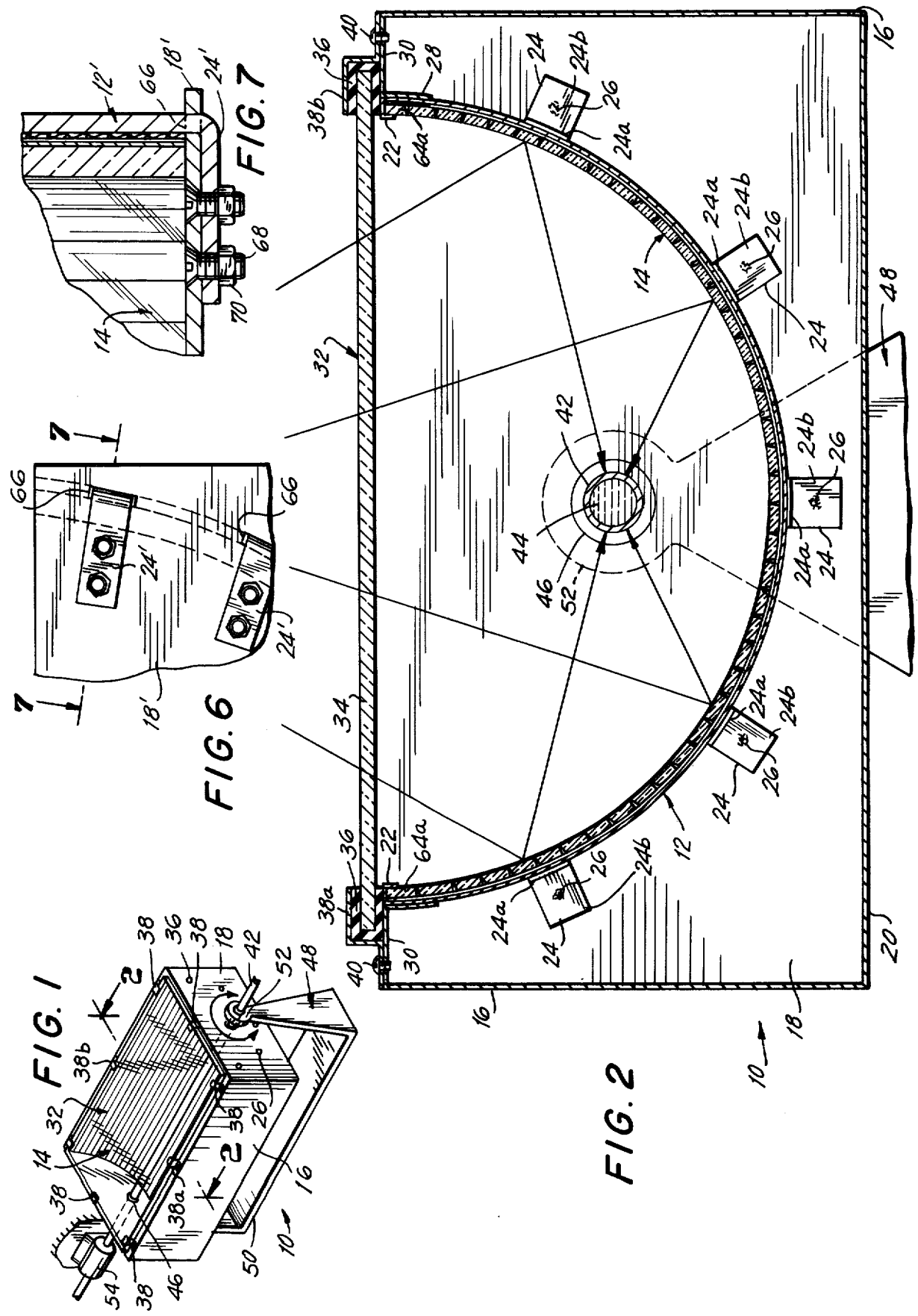

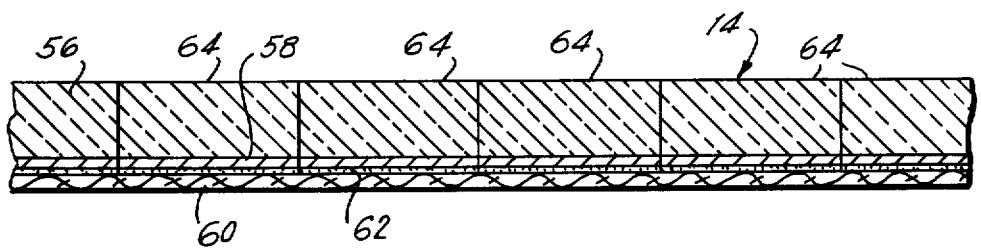
FIG. 3
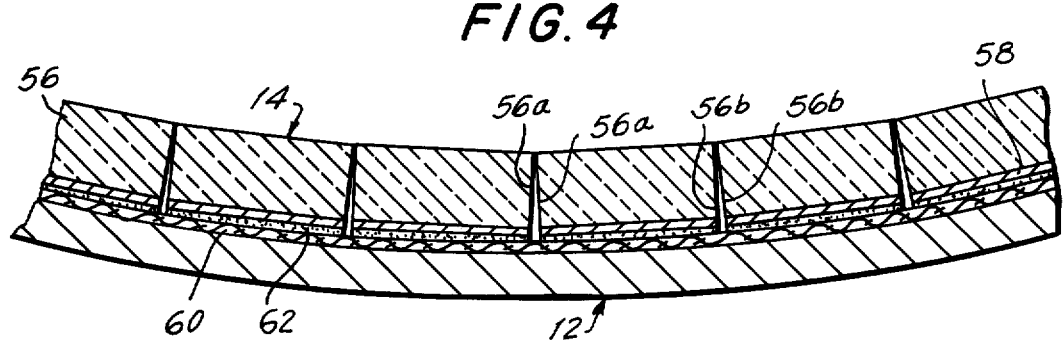
FIG. 4
FIG. 5
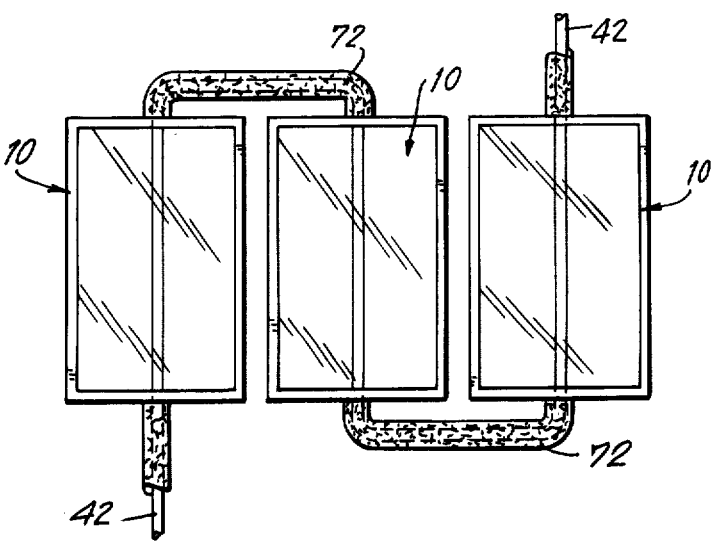

CONCAVE, MIRRORED SOLAR COLLECTOR

The present invention relates generally to solar collectors and, more specifically, to a concave, mirrored solar collector having a series of strips forming the reflecting surface.

The use of various apparatus, generally termed solar collectors, for use in systems to harness solar energy is well-known in the art. Although these collectors take numerous shapes and configurations, it has been found that a solar collector having a concave-shaped reflecting surface is particularly useful, since such a shape allows the sunlight to be focused to a particular area thereby concentrating the sunlight and increasing the collector efficiency.

One type of such a prior art, concave solar collector is disclosed by Walter E. Morrow in *Technology Review* of December, 1973. In this publication, there is disclosed a solar collector having a parabolic-shaped reflecting surface which is used to focus the collected sunlight at a heat absorbing pipe which is located along a longitudinal axis of the reflector. A clockwork drive is provided to rotate the collector to track the sun. The reflecting surface provided in this collector is apparently formed of a continuous, polished metal or a metalized plastic, and this surface is open to the influences of the outside atmosphere.

The above described solar collector is exemplary of prior art devices which are subject to several disadvantages. First, since the reflecting surface is formed of polished metal or metalized plastic, it has been found that it is quite difficult to maintain its reflecting brilliance. Specifically, it has been found that the brilliance of the reflecting surface quickly deteriorates as the surface is cleaned, for example to wipe off dust, since the surface is easily scratched. In addition, where the reflecting surface is formed of a metalized plastic, it has been found that the surface changes its shape under the influence of the heat and the surface has a tendency to buckle when the collector is in use. Another disadvantage arises from the fact that the solar collector is open, thereby subjecting the reflecting surface to the influences of rain, wind, dust, etc. Yet a further disadvantage results from the fact that the reflecting surface must be bent into shape, thereby increasing manufacturing costs since it is expensive to bend the material, in the first place, and since this means that each reflecting surface must be custom made for each concave shape, in the second place.

To overcome some of the disadvantages of using polished metal or metalized plastic as the reflecting surface, it has been proposed that the reflecting surface be fabricated from mirrored glass starting from flat glass sheets. However, this has proven to be unsatisfactory for several additional reasons. Specifically, it has been found that providing such a reflecting surface is exceedingly costly since the glass "blanks" or sheets must be bent or otherwise formed to provide the concave shape and then the glass blanks must be ground, polished and coated with a silvering background to provide the "mirror" effect. The costs involved are prohibitive, both from a standpoint of labor and from a standpoint of the necessary optical, grinding and machinery necessary to provide the requisite item. Further, it is very cumbersome and difficult to work with such a reflecting surface, it is difficult to transport and, most importantly, the mirrored surface is vulnerable to breakage if it is not handled correctly. Yet another disadvantage in using a glass, mirrored reflecting surface results from the fact that although the brilliance of the reflecting surface is less subject to the effects of dirt or dust, the reflecting surface is seriously effected by water or similar substances which may seep against the back of the reflecting surface and "attack" the silvered or mirrored back face.

Accordingly, it is a broad object of the present invention to provide a concave, mirrored solar collector which overcomes the disadvantages of the prior art.

Another object of the present invention is to provide a concave, mirrored solar collector which is relatively inexpensive and easy to manufacture.

Another object of the present invention is to provide a concave, mirrored solar collector having a high quality glass, mirrored reflecting surface which provides a high quality reflecting surface for the collector.

Yet another object of this invention is to provide a glass, mirrored reflecting surface which may be used with solar collectors, having diverse concave shapes.

Another object of this invention is to provide a concave, mirrored solar collector which is efficient in operation and not as subject to outside atmospheric effects as collectors of the prior art.

These and other objects of the present invention are obtained by providing a concave, mirrored solar collector having a generally elongate, concave shaped shell which is provided to support the reflecting surface. The shell is supported by end panels or walls which are connected to the shell by a series of L-shaped flanges which may be bolted to the end walls. The L-shaped flanges may be separate flanges welded to the shell, or may be stamped out from the shell. The shell is also connected to side walls, for example, by bolts or welding. Both the end walls and the side walls serve to insulate the shell from outside atmospheric conditions.

The reflecting surface for the collector takes the form of a series of mirrored glass strips which are formed by taking a sheet of float glass (preferably of a length equal to the length of the collector and a width substantially equal to the linear dimension along the concave surface), silvering the back surface with a high reflective film to form a mirror, and painting the back surface with an epoxy paint to protect the film against atmospheric influences. A flexible glue is then used to attach the mirrored sheet to a stretchable fabric backing. The mirrored sheet is then cut into a series of narrow strips, with the cloth or fabric backing holding the strips together. This enables the sheet to be "bent" to conform to the shape of the supporting shell and to provide the reflecting surface for the collector. This also enables the sheet to be rolled up, if necessary, and easily transported for insertion into a shell.

The collector also includes a pipe, carrying water or similar heatable fluid or material, which is disposed along a longitudinal axis of the collector so that sunlight, reflected from the reflecting surface, can heat the pipe and the material carried therein.

To protect the collector from rain, humidity, dirt, wind and other atmospheric effects, a cover disposed over the reflecting surface is provided at the top of the shell. The cover is formed of glass or other suitable material which will enable the sunlight to travel therethrough and onto the mirrored, reflecting surface. A U-shaped rubber gasket, along the edge of the glass, is provided for acting as a seal. The cover may be connected to the shell and/or the supporting walls by a series of Z-shaped clips, which clamp the cover over the shell.

In order to optimize the sunlight which is incident onto the collector, appropriate drive means, such as a motor-driven gearing arrangement is provided to rotate the collector back and forth during the daylight hours to "track" the sun.

The above description of the present invention will be more fully appreciated by reference to the following detailed description of preferred, but nonetheless illustrative embodiments, when taken in conjunction with the accompanying drawings, wherein:

FIG. 1 is a front, perspective view of a concave, mirrored solar collector, according to the present invention;

FIG. 2 is a sectional view, enlarged in scale, taken substantially along the line 2–2 of FIG. 1 and looking in the direction of the arrows;

FIG. 3 is a sectional view, enlarged in scale, showing the elements forming the reflecting surface used in the solar collector of the present invention before the glue and cloth backing are stretched to allow the reflecting surface to conform to the shape of the supporting shell;

FIG. 4 is an enlarged view of a portion of FIG. 2, showing the reflecting surface resting in the supporting shell;

FIG. 5 is a schematic view showing the use of several solar collectors according to the present invention, connected in series;

FIG. 6 is a partial end view, enlarged in scale, showing the details of a concave, mirrored solar collector according to an alternative embodiment of the present invention; and, FIG. 7 is a sectional view, taken substantially along the line 7—7 of FIG. 6 and looking in the direction of the arrows.

Referring now to the drawings and, more particularly, to FIGS. 1–4 thereof, a concave, mirrored solar collector according to the present invention is generally designated 10. Solar collector 10 includes a supporting shell, generally designated 12, which is adapted to support a mirrored, glass reflecting surface, generally designated 14. The collector includes two side walls 16, two end walls or panels 18 and a bottom wall 20. The side, end and bottom walls are connected together to form a box-like collector body, open at the top, into which the supporting shell 12 is inserted.

The supporting shell 12 is generally concave in shape, that is, it has a uniform, elongated concave cross section, and is open at both ends. It may be fabricated from galvanized steel or cold rolled steel and thereafter enamelled. The shell functions to support the mirrored, glass reflecting surface, as explained hereinafter. As shown in FIG. 2, generally U-shaped, downwardly extending flanges 22 are disposed along the top edges of the shell and these are adapted to receive the end strips of the mirrored, glass reflecting surface to hold the reflecting surface in place within the shell.

The shell is supported within the collector body in part by a series of L-shaped flanges 24 which secure the shell to the end walls 18. Specifically, legs 24a of the flanges are secured to the underside of supporting shell 12, for example, by welding or the like. The other legs 24b of the flanges define appropriate apertures (not shown) which communicate with apertures (not shown) in end walls 18. Fastening members 26, for example, nut and bolt members, pass through these apertures to connect the L-shaped flanges to the end walls and, therefore, to support the shell between the two end walls. Of course, flange leg 24b may be otherwise secured to the end walls 18, for example, by welding or the like. It will also be appreciated that other ways of connecting the supporting shell to the end walls may be used, if so desired. Supporting shell 12 is further supported within the collector body by supporting elements 28 which extend downwardly from the inwardly extending top edges 30 of the side walls 16. The supporting elements 28 may be welded or otherwise permanently fastened to the underside of supporting shell 12 to support the shell. Alternatively, the shell may merely rest against the supporting elements without being permanently fastened thereto.

To protect the collector from heat losses and rain, humidity, dirt, wind or similar outside atmospheric effects, a collector cover, generally designated 32, is disposed at the top of collector 10, over the supporting shell. Cover 32 is formed from a sheet of glass 34 or similar transparent material which allows the sunlight to penetrate therethrough. To provide a tight seal between the glass sheet and the collector body, U-shaped rubber gaskets 36 are provided along each edge of the glass sheet 34. A plurality of Z-shaped clamps 38 are also provided to secure cover 32 to the top of the collector body. These clamps provide a tight friction fit for cover 32, by clamping the rubber gasket against the top of the collector body. The clamps may be connected to the collector body as shown in FIG. 2, wherein representative Z-shaped clamps 38a and 38b are connected to the top edges 30 of side walls 16 by screws 40 which pass through one leg of the clamp and through the top edge 30 of the wall. The screws are removable to loosen the clamps, thereby enabling the cover 32 to be removed from the top of the collector body.

Collector 10 includes a pipe 42, which is adapted to carry water or similar heatable fluid or material 44. Pipe 42 is disposed along a longitudinal axis of the collector. As is generally understood, the heatable material 44 carried within pipe 42 is heated by the sunlight which is reflected off of the mirrored, glass reflecting surface 14 and focused onto the pipe. In order to retain the heat, the outside of pipe 42 may be painted with a black heat-absorbing paint; and, in addition thereto, the inside of end walls 18 may be "mirrored", so that sunlight striking these wall surfaces may also be reflected onto the pipe. The pipe extends between the end walls 18 of the collector, with the pipe resting within an insulating ring 46 disposed at the end walls.

To support the collector and also to enable the collector body to be rotated, the collector includes a stand, generally designated 48. Stand 48 includes a base 50 and two upstanding ears 52. The pipe passes through the ears 52 and the ears provide an axis about which the pipe, which carries collector 10, is rotated. Appropriate motive means 54, which is connected to the pipe, is provided for rotating the pipe and the collector body back and forth, so that the collector can "track" the sun.

FIGS. 3 and 4 show the constructional details of the mirrored, glass reflecting surface 14. As illustrated therein, the reflecting surface 14 is formed from a sheet of "float" glass 56. The sheet should be approximately 1 to 3 millimeters in thickness, should be of a length substantially equal to the length of the collector, i.e., the distance between end walls 18, and should have a width substantially equal to the linear distance taken along the concave surface of the supporting shell. Thus, it is advanageous for the glass sheet 56 to be of a size to generally conform to the size of the supporting shell so that the reflecting surface eventually formed can readily be inserted into the shell. Of course, it may be possible and, in fact, even necessary, to utilize a reflecting surface formed of several glass sheets resting side by side within the shell — especially for very large collectors.

Once the size of the glass sheet is chosen, one surface of the sheet is coated or "silvered" with a high reflection film and this film is then protected with galvanic copper and, preferably, is painted over by at least two coats of epoxy paint. This provides the "mirroring" of the glass sheet and serves to further protect the mirrored sheet against atmospheric changes, such as humidity, acidity or pollution. The "mirrored" surface, including the reflecting film, the galvanic copper layer and the coats of epoxy paint, is indicated in the drawings of FIGS. 3 and 4, as layer 58. The mirrored sheet, formed by glass sheet 56 and its mirrored surface or layer 58, is then connected to a sheet of stretchable material 60, such as cloth or the like, by gluing the stretchable material to the mirrored sheet. This is illustrated by glue layer 62. The glue should have at least two attributes. First, it should not "attack" the mirrored surface 58 and, second, it should also be able to stretch or expand, along with stretchable material 60.

Having so attached the mirrored sheet (comprising glass sheet 56 and mirrored surface 58) to the stretchable backing 60 by way of glue 62, the mirrored sheet, glue and backing are then cut to provide a series of narrow mirrored strips 64, running along the length of the mirrored sheet. Although the width of each individual strip depends somewhat on the curvature of the shell, strips having widths from approximately ¼ inch to 2 inches should be sufficient, for most purposes. As shown clearly in FIG. 4, the "cut" made in layers 56, 58 and 62 should go no deeper than the beginning of the stretchable fabric layer 60. (Depending on the thickness of the glue layer 62, the cut may or may not penetrate this layer.) It will be appreciated that mounting the mirrored sheet on stretchable backing and cutting the mirrored sheet into strips enables the glass, reflecting surface 14 to conform to the concave curvature of supporting shell 12.

Thus, and is illustrated in FIG. 4, when the mirrored, glass reflecting surface 14 is inserted into the supporting shell 12, the fabric and glue layers 60 and 62 "stretch" so that the edges 56a of each strip furthest away from the supporting shell 12 still remain substantially next to each other, while the edges 56b of the strips near the supporting shell 12 move slightly away from each other thereby allowing the strips 56 to conform to the curvature of the shell. The stretchable fabric layer 60 nonetheless acts as a support for the strips 64, thereby keeping the strips together and facilitating the placement of the strips within the supporting shell.

After the mirrored sheet has been cut into the requisite number of mirrored strips 64, as indicated hereinabove, the reflecting surface 14 is inserted into the supporting shell 12, as indicated in FIG. 2. As indicated previously, the reflecting surface 14 is formed from a float glass sheet 56 which is sized so that when the mirrored sheet is cut into the mirrored strips, the reflecting surface generally conforms to the supporting shell; in addition, the size of the individual strips, i.e., their widths, are cut of sufficient size to enable the reflecting surface to conform to the concave curvature of the supporting surface and to be compatible with the size of the pipe 42.

The reflecting surface 14 is inserted into the supporting shell 12 such that the end-most strips 64a of the reflecting surface fit underneath the U-shaped flanges 22 of the supporting shell (see FIG. 2). This provides at least two advantages. First, the flanges 22 may be crimped over the outermost edges of these two end strips, thereby helping to secure the reflecting surface 14 as a whole within the supporting shell. Second, the U-shaped flanges prevent moisture, dirt and the like, which may otherwise seep around cover 32, from seeping between supporting shell 12 and the stretchable fabric layer 60. This is a decided advantage over conventional solar collectors utilizing glass, mirrored reflecting surfaces since, in these prior art devices, water seepage at the back of the reflecting surface penetrates into the silver film and slowly oxidizes the silver which results in cloudiness for the reflecting surface.

It will be appreciated that for most concave-shaped supporting shells, it has been found that the mirror glass reflecting surface 14 is adequately maintained within the shell. However, in those cases where the concave curvature of the supporting shell is quite pronounced and where the U-shaped flanges 22 cannot maintain the reflecting member within the shell, it may be necessary to use auxiliary means, for example, separate glue or the like, to secure the reflecting surface within the shell.

FIGS. 6 and 7 illustrate an alternative embodiment of the concave, mirrored solar collector according to the present invention. Specifically, in the embodiment disclosed in these two figures, the supporting shell 12' is connected to the two end walls 18' by L-shaped flanges 24' which are stamped out from the same piece of material which forms the supporting shell. Thus, the L-shaped flanges 24' are stamped out in the form of tongues from the supporting shell and the flanges are adapted to fit through corresponding slots 66 formed in the end walls. As illustrated in FIG. 7, fastening elements, such as bolts 68 and nuts 70, connect the flanges 24' to the side walls 18' thereby supporting the shell 12'.

FIG. 5 illustrates, in schematic representation, how several solar collectors according to the present invention may be connected in series, that is, with the pipes 42 connected together so that the same heatable material 44 that flows through one pipe also flows through the others. In this manner, the heatable material 44 flowing through the pipes 42 is heated by the action of the several solar collectors, thereby increasing the temperature of the material to a greater degree than if a single solar collector were utilized. Appropriate insulation 72 may surround the pipes 42 to prevent heat loss or the like.

In summary, it will be appreciated that the foregoing disclosure describes a concave, mirrored solar collector having several advantages over collectors of the prior art. Thus, the use of a mirrored, glass reflecting surface which is formed from a series of mirrored strips connected together by stretchable backing allows the reflecting surface to conform to virtually any concave shaped supporting shell. Such a shape may be cylindrical, eliptical, parabolic, etc. The provision of including a cover for the solar collector reduces the effects of heat losses and rain, wind, or the like on the collector and prevents dirt, etc. from falling onto the reflecting surface. The fact that the end strips of the reflecting surface are inserted within protecting means, such as the U-shaped flanges, further reduces the effects of the outside atmosphere and, specifically, prevents dirt and moisture from seeping down between the shell and the reflecting surface. Of course, the metal supporting shell not only supports the mirrored reflecting surface but also protects this member from atmospheric influence. Further protection may be afforded by providing an appropriate insulation on the inside of side walls 16.

It will be appreciated, therefore, that the above described invention provides numerous advantages over solar collectors of the prior art. Not only does the collector operate satisfactorily, but the collector may be provided at lower costs than collectors utilizing a glass, metal or plastic reflecting surface which must be individually formed to conform to the concave shape of a specific supporting shell.

Obviously, numerous modifications will be apparent in light of the above disclosure. For example, the particular thickness of the float glass (or the width of individual strips of the float glass when cut) may be varied, depending on the shape of the concave shell. It may also be possible to provide a cover for the collector consisting of several layers of glass separated by an air space, since such a cover may further reduce heat losses. Still further, other ways of connecting the mirrored strips to the flexible backing can be utilized. For example, pressure sensitive vinyl tape may be used for this purpose. In addition, it is possible to have the supporting shell non-continuous within the collector as long as the same adequately supports the mirrored strips therein. Thus, the supporting shell may take the form of a series of concave strips disposed within the collector. It will be appreciated, therefore, that the above described embodiments are merely illustrative of the present invention, and other embodiments will be apparent to those skilled in the art without departing from the present invention, as set forth in the appended claims.

What is claimed is:

1. A solar collector comprising a supporting shell having a generally elongate concave shape; a mirrored glass reflecting surface formed from a mirrored sheet supported within the supporting shell and including a plurality of mirrored strips cut from the mirrored sheet, a stretchable backing disposed against said supporting shell; a layer of glue adapted to stretch with the stretchable backing for connecting the stretchable backing to the mirrored strips; the layer of glue and the stretchable backing connecting the mirrored strips together so that adjacent edges of the strips furthermost away from the supporting shell rest contiguously next to each other and so that adjacent edges of the mirrored strips nearest the supporting shell are separated from each other thereby enabling the reflecting surface to generally conform to the concave shape of the supporting shell; a cover disposed over the supporting shell for allowing sunlight to penetrate onto the reflecting surface, the cover formed in part of a transparent material; means for sealing the cover over the top of the supporting shell including a gasket disposed along the edges of the cover and a plurality of clamps for removably fastening the gasket and cover to the top of the supporting shell; a collector body for supporting the supporting shell and including at least two end walls and two side walls; means for connecting the side walls of the collector body to the supporting shell; and means disposed between the end walls of the collector body for carrying heatable material through said collector whereby sunlight incident on the reflecting surface is reflected onto said carrying means to heat the material carried therein.

2. A solar collector according to claim 1 further comprising flange means disposed along the top edges of the supporting shell and adapted to receive the outermost edges of the mirrored strips for securing the reflecting surface within the supporting shell and for preventing seepage of pollutants between the supporting shell and the reflecting surface.

3. A solar collector comprising a supporting shell having a generally elongate concave shape, a mirrored glass reflecting surface formed from a mirrored sheet supported within the supporting shell and including a plurality of mirrored strips cut from the mirrored sheet, a stretchable backing for the mirrored strips, said stretchable backing resting within and adjacent to the supporting shell, a layer of glue adapted to stretch with the stretchable backing for connecting the mirrored strips to the stretchable backing, said stretchable backing and said layer of glue connecting the mirrored strips together so that adjacent edges of the mirrored strips furthermost away from the supporting shell are contiguous to each other and so that adjacent edges of the mirrored strips nearest the supporting shell are separated from each other whereby the reflecting surface fits within the supporting shell generally conforming to the concave shape of the supporting shell, means for supporting the supporting shell, and means for carrying heatable material through the collector whereby sunlight incident on the reflecting surface is reflected onto the carrying means to heat the material carried therein.

4. A solar collector according to claim 3 wherein the supporting shell includes means cooperating with the end most mirrored strips for maintaining the reflecting surface within the supporting shell and for preventing seepage of pollutants between the supporting shell and the reflecting surface.

5. A solar collector according to claim 4 wherein the means for maintaining the reflecting surface within the supporting shell and for preventing seepage of pollutants is a downwardly extending U-shaped flange located along each top edge of the supporting shell and adapted to be crimped over the outermost edges of the mirrored strips.

6. A solar collector according to claim 3 further comprising a cover disposed over the supporting shell for allowing sunlight to penetrate onto the reflecting surface and for protecting the reflecting surface.

7. A solar collector according to claim 6 wherein the cover is formed in part of a transparent material.

8. A solar collector according to claim 7 further comprising means for sealing the cover over the top of the supporting shell.

9. A solar collector according to claim 8 wherein the sealing means includes a gasket disposed along the edges of the cover and means for removably clamping the gasket and the cover over the top of the supporting shell.

10. A solar collector according to claim 3 wherein the means for supporting the supporting shell includes at least two end walls and two side walls forming a collector body and means for connecting the collector body to the supporting shell.

11. A solar collector according to claim 10 wherein the means for connecting the collector body to the supporting shell includes a series of flanges connected between the supporting shell and the end walls of the collector body.

12. A solar collector according to claim 10 wherein the means for supporting the supporting shell further includes a stand connected to the material carrying means and the collector further includes means for rotating the collector body about the stand for tracking the sunlight incident on the reflecting surface.

13. A solar collector according to claim 12 wherein the material carrying means is a pipe disposed along a longitudinal axis of the collector, the pipe supported between the end walls of the collector body.

14. A method for forming a solar collector comprising the steps of providing a supporting shell having a generally elongate, concave shape; attaching a stretchable backing to a sheet of mirrored glass by gluing the stretchable backing to the mirrored sheet with stretchable glue; forming a plurality of mirrored strips by cutting the mirrored sheet longitudinally, with the cut going no further than the stretchable backing; forming a reflecting surface by stretching the stretchable glue and the stretchable backing such that the reflecting surface so formed is adapted to fit within the supporting shell; inserting the reflecting surface within the supporting shell such that the endmost mirrored strips are located beneath flanges defined in the supporting shell and such that the adjacent edges of the mirrored strips furthermost from the supporting shell are contiguous to each other and the adjacent edges of the mirrored strips nearest the supporting shell are separated from each other; crimping the flanges over the length of the endmost mirrored strips of the reflecting surface thereby maintaining the reflecting surface in place and preventing seepage of pollutants between the supporting shell and the reflecting surface; and carrying a heatable material through the collector so that sunlight on the reflecting surface is reflected onto the heatable material to heat the same.

* * * * *